US012754515B2

(12) United States Patent
Christan

(10) Patent No.: US 12,754,515 B2
(45) Date of Patent: Oct. 6, 2026

(54) WATCH MOVEMENT WITH DEVICE FOR SETTING THE FREQUENCY OF A MECHANICAL RESONATOR

(71) Applicant: ETA SA Manufacture Horlogère Suisse, Grenchen (CH)

(72) Inventor: Julien Christan, Bienne (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 125 days.

(21) Appl. No.: 18/818,700

(22) Filed: Aug. 29, 2024

(65) Prior Publication Data

US 2025/0147466 A1 May 8, 2025

(30) Foreign Application Priority Data

Oct. 2, 2023 (EP) .................................... 23201138

(51) Int. Cl.
*G04B 18/04* (2006.01)
*G04B 18/08* (2006.01)

(52) U.S. Cl.
CPC ............. *G04B 18/04* (2013.01); *G04B 18/08* (2013.01)

(58) Field of Classification Search
CPC ...... G04B 18/04; G04B 18/08; G04B 18/021; G04B 17/066; G04B 18/023; G04B 17/325
See application file for complete search history.

(56) References Cited

U.S. PATENT DOCUMENTS

| | | | | |
|---|---|---|---|---|
| 1,144,026 A | | 6/1915 | Busenbenz | |
| 2,982,086 A | * | 5/1961 | Loretan | G04B 17/26 368/175 |
| 3,306,026 A | * | 2/1967 | Kocher | G04B 18/023 368/170 |

(Continued)

FOREIGN PATENT DOCUMENTS

| | | |
|---|---|---|
| CH | 39754 A | 4/1908 |
| CH | 220257 A | 3/1942 |

(Continued)

OTHER PUBLICATIONS

European Search Report issued Feb. 9, 2024 in European Application 23201138.7 filed on Oct. 2, 2023, 3 pages (with English Translation of Categories of Cited Documents).

*Primary Examiner* — Sean Kayes
(74) *Attorney, Agent, or Firm* — Oblon, McClelland, Maier & Neustadt, L.L.P.

(57) ABSTRACT

The watch movement includes a mechanical resonator with a balance and a spring, a device for setting the oscillation frequency of the mechanical resonator and a device for setting the guide mark on the mechanical resonator. A moving part of the setting device includes a fastener for attaching an outer end part of the spring and a device for defining the active length of the spring. A mechanism for varying the active length of the spring includes a first toothed wheel, carried by the moving part, and a first toothing, arranged along the outer end part of the spring, with which the first toothed wheel meshes. The fastener holds the outer end part by friction such that the first toothed wheel can drive this outer end part via the first toothing and thus vary the active length of the spring.

13 Claims, 4 Drawing Sheets

(56) References Cited

U.S. PATENT DOCUMENTS

| | | | | | |
|---|---|---|---|---|---|
| 3,630,016 | A * | 12/1971 | Fujihira | G04B 18/025 368/170 |
| 3,733,808 | A * | 5/1973 | Wolber | G04B 18/023 368/173 |
| 3,745,763 | A * | 7/1973 | Zaugg | G04B 18/023 368/176 |
| 7,036,977 | B2 * | 5/2006 | Muhle | G04B 18/023 368/170 |
| 11,397,410 | B2 * | 7/2022 | Bravo | G04B 17/28 |
| 2005/0013201 | A1 * | 1/2005 | Muhle | G04B 18/023 368/175 |

FOREIGN PATENT DOCUMENTS

| | | | |
|---|---|---|---|
| CH | 268588 | A | 5/1950 |
| DE | 1 197 817 | B | 7/1965 |

* cited by examiner

WATCH MOVEMENT WITH DEVICE FOR SETTING THE FREQUENCY OF A MECHANICAL RESONATOR

CROSS-REFERENCE TO RELATED APPLICATION

This application claims priority to European Patent Application No. 23201138.7 filed on Oct. 2, 2023, the entire disclosure of which is hereby incorporated herein by reference.

TECHNICAL FIELD OF THE INVENTION

The invention relates to a watch movement comprising a mechanical resonator and a device for setting the frequency of this resonator. The invention also relates to a device for setting the guide mark of the escapement associated with the mechanical resonator.

In particular, the invention relates to a device for setting the frequency of a mechanical watch resonator that does not affect a previously-set guide mark of the 'balance and anchor' system.

TECHNOLOGICAL BACKGROUND

Patent application BE 483992 A describes various embodiments of a device for setting the frequency of the balance spring forming a mechanical watch resonator. Referring to FIGS. 50 to 54, this document describes such a setting device which has the advantage of enabling the resonator frequency to be set from the outside of a watch case that is arranged so as to enable a user to set the frequency in this way. This setting device comprises a sophisticated system for correcting the frequency of the mechanical resonator, while keeping the 'balance and anchor' system on the guide mark. The setting device is complex. Firstly, it comprises a clamp that firmly holds the outer turn of the spring at a given angular position of a support, called a 'sector', which rotates around the rotational axis of the balance, this clamping of the outer turn defining the active length of the spring and therefore the oscillation frequency of the balance spring. The terminal turn is clamped by a slide bar arranged in the watch case which comprises a protruding inner part arranged so as to be able to act on a resilient arm of the clamp. The slide bar can be actuated substantially tangentially, relative to the rotational axis of the balance, by an actuating member on this slide bar that is accessible from outside the case. The resilient arm is configured such that, in a first angular position of the slide bar, the latter presses laterally against the resilient arm so as to clamp the outer turn and close an access opening to a setting wheel machined in the watch case, and that, in a second angular position, the slide bar frees the access opening while ceasing to exert a lateral force on the resilient arm such that the outer turn is no longer held by the clamp. The setting device also comprises a stud mounted on a second resilient arm of the support and two intermeshing wheels, each of which has a spiral cam. The cam of the first wheel presses against the second resilient arm such that it defines an angular position of the stud and also an angular distance from said clamp. The cam of the second wheel presses against a third spiral cam which is fixed but whose angular position can be adjusted by a watchmaker when setting the initial guide mark, the cam of the second wheel being held against the fixed cam by resilient means for actuating the rotation of said support.

To set the resonator frequency, the second wheel can be actuated by means of a tool when the slide bar is in its second angular position and the clamp has released the outer turn of the spring. This actuation causes the first wheel and its cam to rotate, such that the second resilient arm moves, varying the angular position of the stud and thus the angular distance between this stud and the clamp. As a result, once the clamp is closed, the active distance has varied and therefore also the active length of the spring, such that the oscillation frequency has also varied. The following is an interesting feature of this complex setting device: Rotating the second wheel not only varies the angular position of the stud and thus the active length of the spring, but also moves said support angularly in the opposite direction to the stud and over a substantially identical angular distance, such that the guide mark initially set is not affected, but remains unchanged.

The setting device described above is complex and has a number of drawbacks. Firstly, it consists of a large number of parts that have to be adjusted. Machining certain parts is complex, as is assembling the setting device. Moreover, a significant problem arises from the fact that the oscillation frequency cannot be set once the watch movement has been finished, but only when this watch movement has been mounted in the case, and then only through the access opening provided in a side part of the case. One major problem is that the setting device comprises a part that is mounted on the watch case and that is necessary whenever the frequency needs to be set. Moreover, this setting device requires a number of resilient components, namely two elastically deformable arms and a spring, which must be correctly sized and may show some fatigue over time. Lastly, the end of the outer turn of the spring is conventionally held in a stud, either by a lateral screw or more often by adhesive bonding; these fastening means can create stress on the end of the spring, which affects the precision of the frequency setting.

SUMMARY OF THE INVENTION

The present invention aims to solve the problems of the prior art mentioned in the technological background, by providing a watch movement equipped with a mechanical resonator, consisting of a balance spring and of a device for setting the frequency of this mechanical resonator that is less complex, reliable and self-contained relative to the watch case, and that enables the frequency to be set effectively without changing an initial setting of a guide mark.

To this end, the invention relates to a watch movement comprising:

- a mechanical resonator consisting of a balance, rotatably mounted in a support, and of a spring,
- an escapement comprising an anchor arranged to oscillate synchronously with the balance, and
- a device for setting the oscillation frequency of the mechanical resonator, referred to as the setting device, the setting device comprising a moving part rotating around the rotational axis of the balance, referred to as the moving part, this moving part comprising means for attaching an outer end part of the spring, referred to as the fastening means, and means for defining the active length of the spring, referred to as the defining means, that define an end point of the active part of the spring at a fixed point on the moving part once the spring has been attached to this moving part by the fastening means. The setting device further comprises means for varying the active length of the spring, referred to as the variation means, enabling the oscillation frequency to be set by an angular displacement, relative to said rotational axis and in a chosen direction, of the outer end part relative to the moving part, and thus to said fixed point on this moving part, the setting of the oscillation frequency being combined with a rotation of the moving part over an angular distance substantially corresponding to said angular displacement and in a direction opposite to the chosen direction.

The watch movement further comprises means for setting the mechanical resonator guide mark relative to the anchor, referred to as the guide mark setting means. Said variation means comprise a first toothed wheel, carried by the moving part, and a first toothing, arranged along the outer end part of the spring, which meshes with the first toothed wheel which can be rotated to perform the angular displacement, said fastening means holding the outer end part by friction so as to enable the first toothed wheel to drive this outer end part via the first toothing and thereby angularly displace the outer end part relative to the moving part and to said defining means, so as to vary the active length of the spring. Lastly, the first toothed wheel is in an intermeshing relationship with a second toothing, integral with the resonator support, such that, when the outer end part undergoes said angular displacement in the chosen direction relative to the moving part, this moving part is simultaneously angularly displaced by said angular distance in the opposite direction. Thus, the outer end part does not undergo any angular displacement and the previously-set guide mark is unchanged.

The setting device of the invention does not require a spring. Moreover, it is sufficient to provide a means of actuating the first toothed wheel or the moving part to set the resonator frequency without misaligning a previously-set guide mark. Although this setting device, which enables the oscillation frequency to be set while automatically retaining the guide mark set in a preliminary step, can be provided for a watch that enables such setting once the watch has been fully mounted, it is self-contained relative to the watch case so that such a watch movement can also be mounted in a case that does not enable setting from outside the case. The device may indeed appear complex in terms of the outer end part of the spring that comprises a toothing. Such a toothing can be formed in a part initially separate from the spring and bonded or welded or fastened by any other means to the end of the outer turn of a conventional spring. As nowadays springs are increasingly made of silicon and with micromachining techniques borrowed from the microtechnology field, achieving an outer end part of the spring with lateral toothing, in other words a blank profile of the spring with toothing, poses no particular problem. The same applies to springs made of glass or similar materials. It should be noted that the guide mark can be set simply by a preliminary positioning of the first toothing relative to the first toothed wheel with the moving part in a given initial position.

BRIEF DESCRIPTION OF THE FIGURES

The invention will be described in greater detail below with reference to the appended drawings, which are given by way of non-limiting examples, in which.

DETAILED DESCRIPTION OF THE INVENTION

Figure 1:
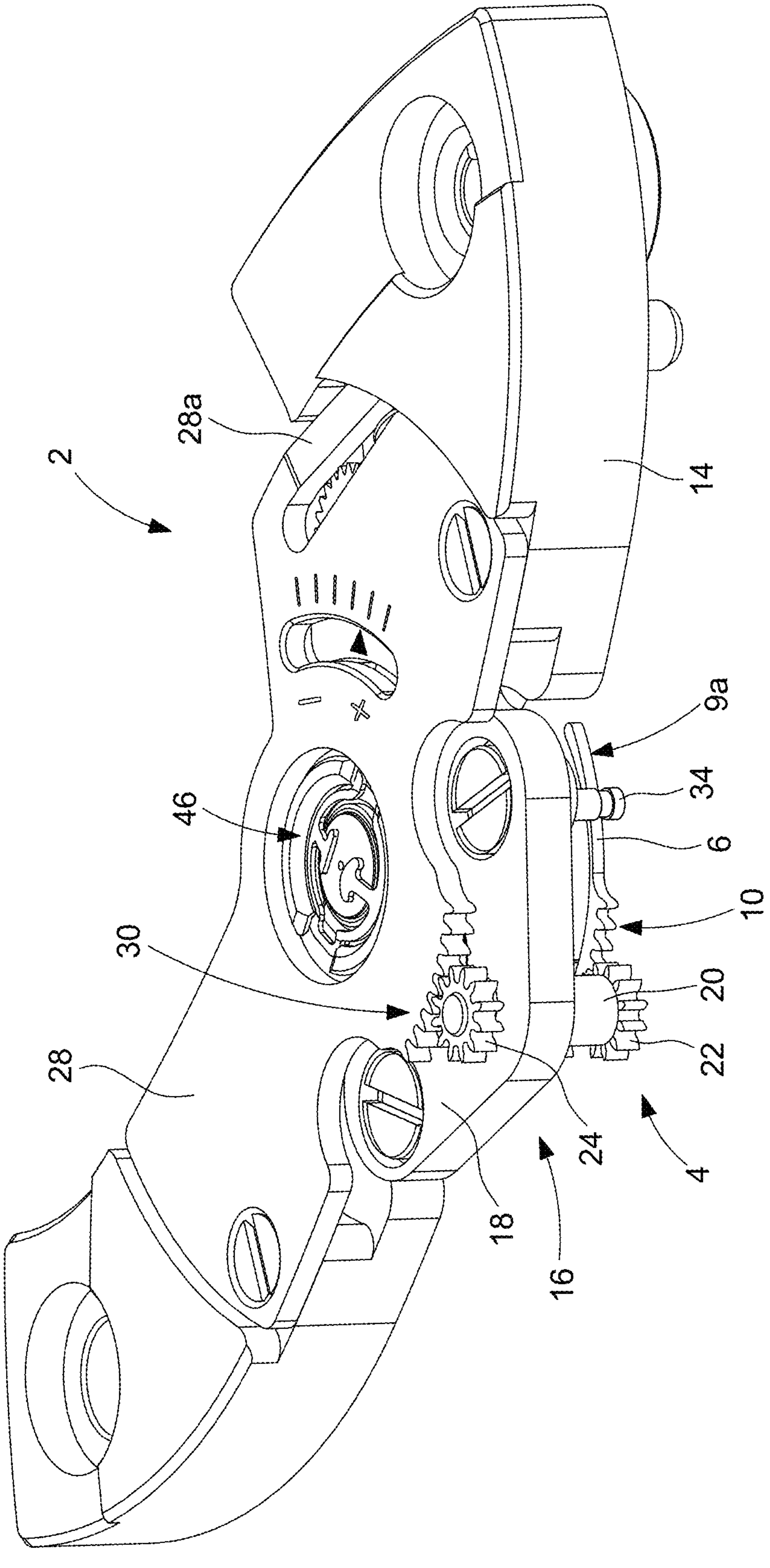
FIG. 1 is a perspective top view of an embodiment of a watch movement according to the invention, this FIG. 1 showing a watch movement assembly comprising the setting device and an outer end part of the spring.
Figure 2:
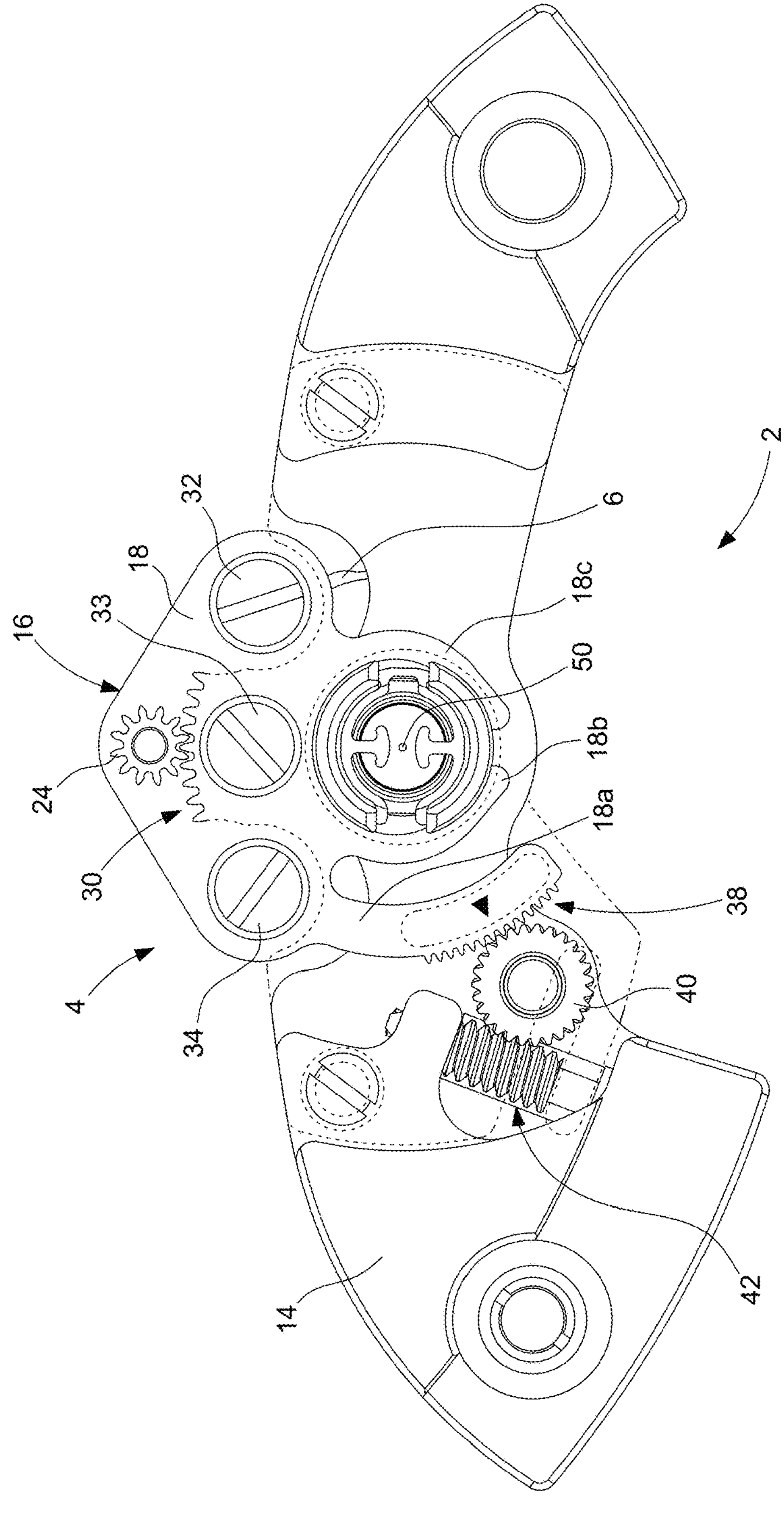
FIG. 2 is a top view of the watch movement assembly shown in FIG. 1, with an upper plate shown as transparent and its contours shown as dashed lines (except for its toothing).
Figure 3:
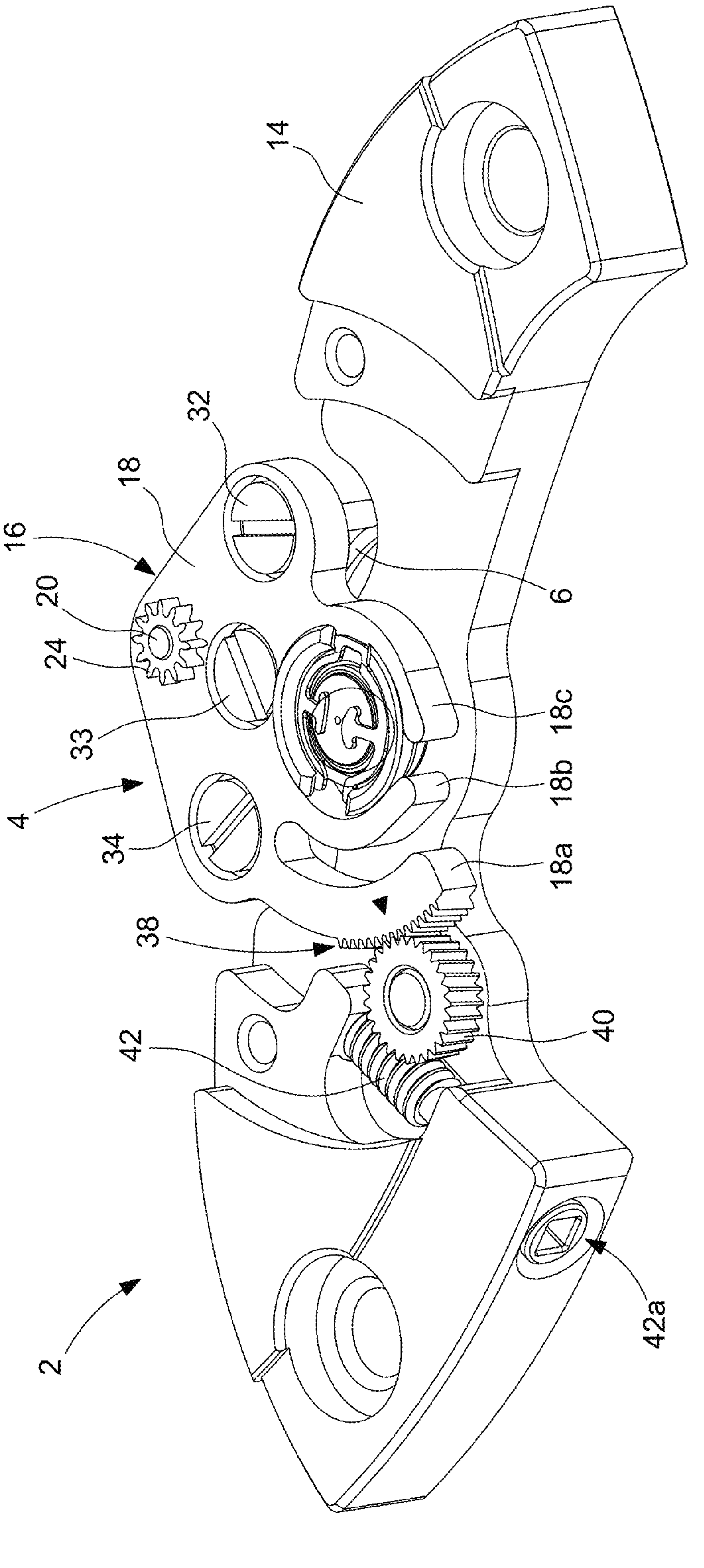
FIG. 3 is a perspective top view of the watch movement assembly in FIG. 1 from which the upper plate has been removed.
Figure 4:
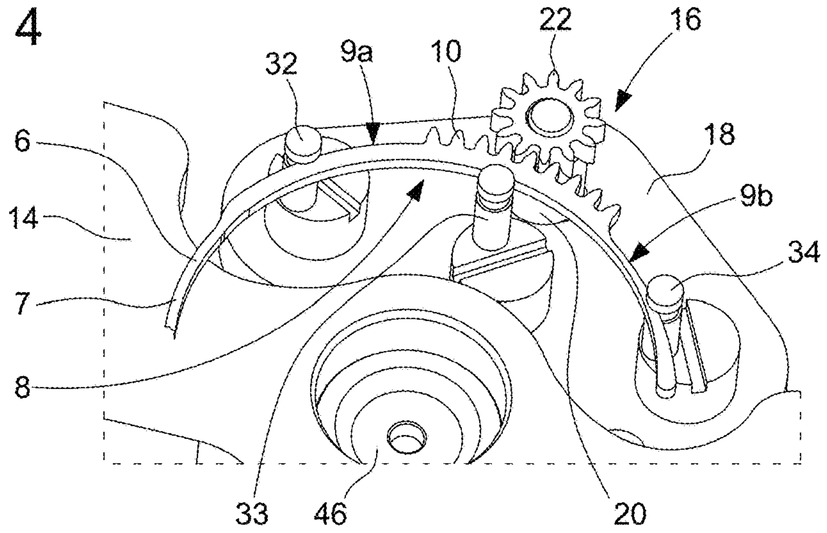
FIG. 4 is a partial perspective view, from underneath, of the assembly and of the outer end part of the spring shown in FIG. 1.

With reference to the figures, the following is a description of a watch movement according to the invention.

The watch movement 2 comprises:

- a mechanical resonator consisting of a balance, rotatably mounted in a support (only the balance bar 14 forming this support is shown in the figures), and of a spring 6 (only a portion of the outer turn 7 and the outer end part 8 of the spring are shown in the figures),
- an escapement comprising an anchor arranged to oscillate synchronously with the balance (the escapement is not shown in the figures, in particular a conventional watch escapement with a Swiss-type anchor), and
- a device 4 for setting the frequency of the mechanical resonator, referred to as the ‘setting device’.

In particular, the balance is a typical balance with a plate that has a pin which acts as a periodic coupling member between the anchor and the oscillating balance, resulting in a to-and-fro movement of the anchor which thus oscillates synchronously with the balance. The setting device 4 comprises a moving part 16 rotating around the rotational axis 50 of the balance, referred to as the ‘moving part’, the function of this moving part 16 being to fasten the outer end part 8 of the spring 6 and to define the active length of this spring. Moreover, the moving part 16 and the outer end part 8 are arranged to enable the mechanical resonator guide mark to be set relative to the escapement anchor. In addition, as will be understood more clearly hereafter, the moving part 16 is arranged such that, once the resonator and the setting device 4 have been mounted in the watch movement 2, a variation of the active length of the spring, in order to set the oscillation frequency of the mechanical resonator, is obtained while retaining the angular position of the outer end part as determined at the time of its fastening, and thereby a stable angular position of the balance spring at rest, so as not to lose a previously-set guide mark. Thus, in particular, the active length of the spring is varied while retaining a correct alignment of the balance pin at rest, namely, a radial alignment on the rotational axis of the balance and the rotational axis of the anchor.

Figure 5A:
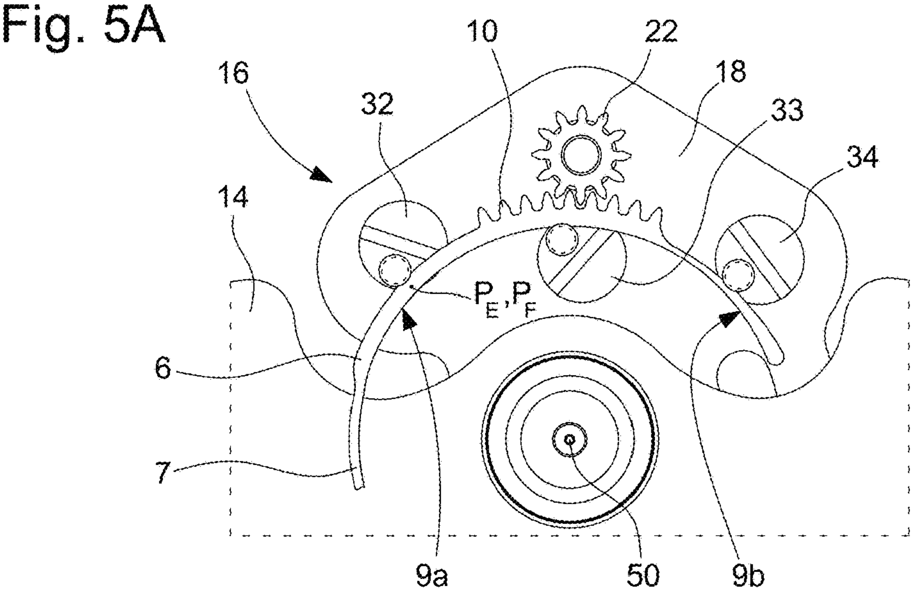
FIGS. 5A and 5B are partial views, from underneath, of the assembly and of the outer end part of the spring shown in FIG. 1, with the moving part in two different positions corresponding to two different active lengths of the spring.
Figure 5B:
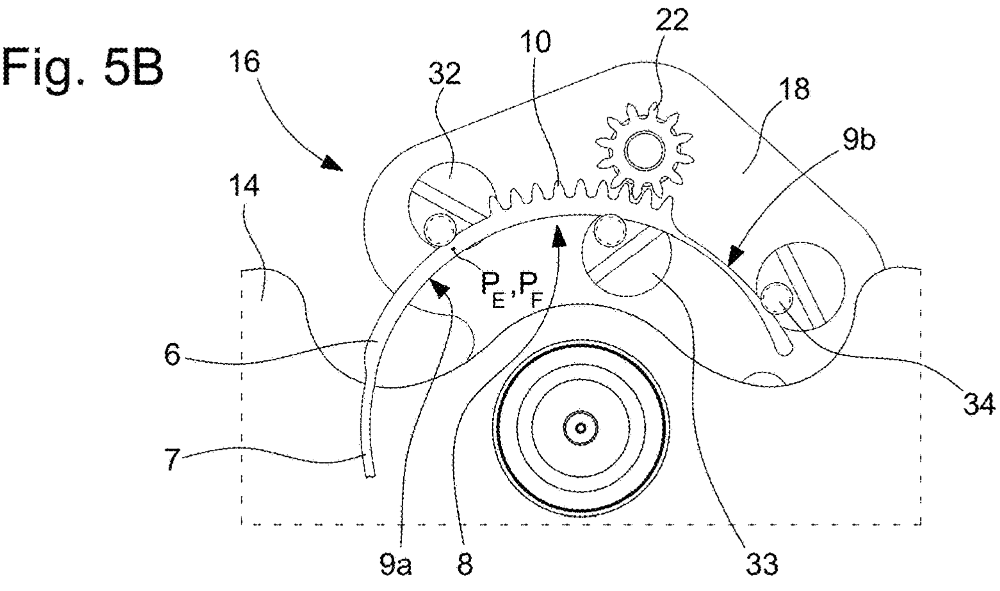

Thus, in general, the moving part 16 comprises means for attaching the outer end part 8 of the spring 6, referred to as the ‘fastening means’, and means for defining the active length of the spring 6, referred to as the ‘defining means’, that define an end point $E_P$ on the active part of the spring 6 at a fixed point $F_P$ on the moving part 16 once the spring has been fastened to this moving part by the fastening means. The setting device 4 further comprises means for varying the active length of the spring, referred to as the ‘variation means’, enabling the oscillation frequency to be set by an angular displacement, relative to the rotational axis 50 and in a chosen direction, of the outer end part 8 relative to the moving part 16, and thus to said fixed point $F_P$ on this moving part, combined with a rotation of the moving part around said rotational axis over an angular distance substantially corresponding to said angular displacement and in a direction opposite to the chosen direction (see FIGS. 5A and 5B). The watch movement further comprises means for setting the mechanical resonator guide mark relative to the escapement anchor, referred to as the 'guide mark setting means', in a preliminary step. This preliminary step is either a step that takes place when the resonator is mounted in the watch movement, or a step that takes place when the watch movement is serviced by a watchmaker.

According to the invention, the variation means consist of a first toothed wheel 22, carried by a plate 18 on the moving part 16, and a first toothing 10, arranged along the outer end part 8 of the spring, which meshes with the first toothed wheel which can be rotated to perform the aforementioned angular displacement. Preferably, the spring is made of silicon or of glass and obtained using a micromachining technique. Thus, the first toothing can be easily made when manufacturing the spring 6.

According to the invention, the fastening means hold the outer end part 8 by friction so as to allow the first toothed wheel 22 to drive this outer end part via the first toothing 10 and thus to angularly displace the outer end part relative to the moving part 16 and to said defining means, so as to vary the active length of the spring 6. The first toothed wheel 22 is in an intermeshing relationship with a fixed toothing 30 that comprises an upper plate 28 which is fastened to the resonator support, more generally of a second toothing 30, integral with this support, such that, when the outer end part undergoes said angular displacement in the chosen direction relative to the moving part 16, this moving part is simultaneously angularly displaced by said angular distance in the opposite direction.

In the advantageous variant shown in the figures, said fastening means further comprise a first eccentric 32 and a second eccentric 33 that are arranged respectively on either side of the outer end part 8 of the spring 6. These first and second eccentrics can each be turned by a tool such that, when the spring is mounted in the movement 2, they are brought into contact respectively against first and second lateral flanks of the outer end part 8, when the spring 6 is in an unconstrained state and thus in its own rest position, such that the portion of the outer end part located between the first and second eccentrics 32 and 33 has a spatial positioning corresponding to that of the spring's own rest position for any oscillation frequency setting within a useful range, and that this portion can maintain, following the fastening of the outer end part, this spatial positioning when the mechanical resonator oscillates. This feature is highly advantageous for ensuring that, when the watch movement is ticking, the oscillation of the spring is properly centred on the rotational axis 50. This increases the precision of the watch movement. The second eccentric 33 is positioned facing the wheel 22 which is located on the other side of this second eccentric relative to the outer end part 8. The second eccentric 33 also keeps the first toothing in the first toothed wheel 22 and thus ensures that they mesh. The various parts involved in the radial positioning of the outer end part of the spring 6, the radial positioning of the first toothed wheel and the latter are preferably machined to sufficiently low tolerances so that, in the spring's own rest position (spring in the unconstrained state), the first toothing 10 is in an intermeshing relationship with the first toothed wheel 22 with a certain amount of clearance. In fact, if this were not the case, it would be impossible to have meshing between the first toothed wheel and the first toothing of the spring while keeping the portion of the outer end part 8 between the first and second eccentrics 32, 33 with a spatial positioning corresponding to that of the spring's own rest position. It should be noted that the first and second eccentrics advantageously have a circular groove in which the outer end part 8 is placed. Such a groove enables this outer end part to be axially positioned.

The means for defining the active length of the spring 6 consist of the first eccentric 32, against which a first part 9*a* of the outer end part 8 presses. The contact point at which this first part 9*a* presses against the first eccentric defines the end of the active part of the spring and therefore the end point $E_P$ of its active length. This end point is located at the contact point, which is fixed relative to the moving part, such that the end point is always located at a specific fixed point $F_P$, i.e., at an invariable point on the moving part.

The guide mark setting means consist of the first toothing 10 on the spring 6, arranged along a median part of the outer end part 8 of this spring, and the first toothed wheel 22, the guide mark being set by a preliminary angular positioning of the first toothing relative to the first toothed wheel while the moving part 16 is in a given initial angular position, which may be any position in the angular travel of the moving part, but preferably substantially in the middle of this angular travel.

In the variant described, said fastening means comprise a third eccentric 34 that is arranged on the same side of the outer end part of the spring as the first eccentric 32, the second eccentric 33 being located between the first and third eccentrics along the outer end part, the first eccentric 32 being located towards the outer turn 7 of the spring 6 relative to the second eccentric. The third eccentric is arranged so that it can be turned by a tool to exert a third lateral force $F_3$ against the outer end part 8, such that the first and second eccentrics react by exerting, respectively, a first lateral force $F_1$ and a second lateral force $F_2$ against the outer end part 8 which is thus kept in place, in the absence of rotation of the first toothed wheel 22, by frictional forces between this outer end part and the first, second and third eccentrics.

According to an advantageous feature, the first lateral force $F_1$ can be of such magnitude and the first part 9*a* of the outer end part 8, located facing the first eccentric 32, has a chosen stiffness such that this first part can remain in contact with the first eccentric when the mechanical resonator is oscillating. Thus, once set, the active length of the spring remains constant when the resonator is oscillating, despite the fact that the first part 9*a* is only in contact on one side with the means for defining the active length of the spring, which consist solely of the eccentric 32. In particular, the stiffness of the first part 9*a* is chosen to enable the oscillation frequency to be precisely set.

According to a particular feature of the fastening means, the outer end part 8 has a terminal part 9*b* located after the first toothing 10 that occupies an intermediate part of this outer end part, the terminal part 9*b* being more flexible than the first part 9*a* and being located facing the third eccentric 34, which can exert the third lateral force $F_3$ against this terminal part. Preferably, the width of the terminal part 9*b* increases towards its free end, such that the third lateral force $F_3$ remains substantially constant for any frequency setting and therefore for any active length within the expected setting range.

In the embodiment described, the moving part 16 comprises a second toothed wheel 24 coaxially mounted with the first toothed wheel 22, these first and second toothed wheels being fastened to the same spindle 20 so that they rotate together. The second toothed wheel 24 meshes with the fixed toothing 30 of the upper plate 28, which is attached to the balance bar 14 that forms part of the mechanical resonator support.

According to a particular variant, the moving part 16 comprises a third toothing 38 carried by an arm 18*a* of the plate 18 and the mechanical movement 2 comprises a device for rotating the moving part around said rotational axis 50 via the third toothing. The plate 18 also comprises two resilient arms 18*b* and 18*c* that form a split ring surrounding the support of the shock-resistant bearing 46, which thus guides the moving part 16 in rotation. The drive device is arranged such that it can be actuated from the lateral periphery of the movement to rotate the moving part 16, so as to create a variation of the active length of the spring 6 from this lateral periphery via the first and second toothed wheels 22, 24. The drive device comprises a third toothed wheel 40 that meshes with an Archimedes screw 42, which has an end 42*a* that is accessible from the lateral periphery of the mechanical movement and which has a non-cylindrical coupling part, designed to allow it to be coupled to a member for actuating this Archimedes screw. It should be noted that the upper plate 28 has a tab 28*a* that keeps the Archimedes screw in an invariable longitudinal position, such that when this Archimedes screw is rotated, the toothed wheel 40 is driven in rotation even in the absence of any longitudinal pressure exerted on the Archimedes screw.

The invention also relates to a watch that comprises a mechanical movement according to the invention. This watch comprises a case (not shown) housing the mechanical movement 2 and is arranged so as to enable the driving device of the moving part to be actuated by the aforementioned actuating member (not shown) which can be operated from outside the watch.

The invention claimed is:

1. A watch movement comprising:

a mechanical resonator including a balance, rotatably mounted in a support, and of a spring, an escapement comprising an anchor arranged to oscillate synchronously with the balance, and a setting device for setting an oscillation frequency of the mechanical resonator, the setting device comprising a moving part rotating around a rotational axis of the balance, said moving part comprising fastening means for attaching an outer end part of the spring, and defining means for defining an active length of the spring, that define an end point (EP) of an active part of the spring at a fixed point (FP) on the moving part once the spring has been attached to said moving part by the fastening means, the setting device further comprising variation means for varying the active length of the spring, enabling the oscillation frequency to be set by an angular displacement, relative to said rotational axis and in a chosen direction, of the outer end part relative to the moving part, and thus to said fixed point on said moving part, the setting of the oscillation frequency being combined with a rotation of the moving part over an angular distance substantially corresponding to said angular displacement and in a direction opposite to the chosen direction; the watch movement further comprising guide mark means for setting an mechanical resonator guide mark relative to said anchor, wherein the variation means comprise a first toothed wheel, carried by the moving part, and a first toothing, arranged along the outer end part of the spring, with which the first toothed wheel meshes and which can be rotated to perform said angular displacement, said fastening means holding the outer end part by friction so as to enable the first toothed wheel to drive said outer end part via the first toothing and thus to angularly displace the outer end part relative to the moving part and to said defining means, so as to vary the active length of the spring; and in that the first toothed wheel is in an intermeshing relationship with a second toothing, integral with the resonator support, such that, when the outer end part undergoes said angular displacement in the chosen direction relative to the moving part, said moving part is simultaneously angularly displaced by said angular distance in the opposite direction.

2. The watch movement according to claim 1, wherein the spring is made of silicon or of glass and obtained by a micromachining technique.

3. The watch movement according to claim 1, wherein said fastening means comprise a first eccentric and a second eccentric that are arranged respectively on either side of the outer end part of the spring and that can be turned by a tool such that, when the spring is mounted in the watch movement, they are brought into contact respectively against first and second lateral flanks of the outer end part, while the spring is unconstrained and thus in its own rest position, such that a portion of the outer end part between the first and second eccentrics has a spatial positioning substantially corresponding to that of the spring's own rest position for any oscillation frequency setting within a useful range, said fastening means retaining said spatial positioning to said portion of the outer end part once fastened, the first eccentric constituting said defining means.

4. The watch movement according to claim 3, wherein said fastening means comprise a third eccentric that is arranged on the same side of the outer end part of the spring as the first eccentric, the second eccentric being located between the first and third eccentrics along the outer end part, the first eccentric being located towards the outer turn of the spring relative to the second eccentric and the third eccentric being arranged so that the third eccentric can be turned by a tool to exert a third lateral force against the outer end part such that the first and second eccentrics react by exerting, respectively, a first lateral force and a second lateral force against the outer end part which is thus kept in place, in the absence of rotation of the first toothed wheel, by frictional forces between said outer end part and the first, second and third eccentrics.

5. The watch movement according to claim 4, wherein said first lateral force can be of such magnitude and a first part of the outer end part, located facing the first eccentric, has a chosen stiffness such that said first part can remain in contact with the first eccentric when the mechanical resonator is oscillating.

6. The watch movement according to claim 5, wherein said stiffness is chosen to enable the oscillation frequency to be precisely set.

7. The watch movement according to claim 5, wherein the outer end part has a terminal part, located after the first toothing, that is more flexible than said first part and located facing the third eccentric, which can exert said third lateral force against said terminal part.

8. The watch movement according to claim 1, wherein a guide mark setting means include the first toothing of the spring and the first toothed wheel, the guide mark being set by a preliminary positioning of the first toothing relative to the first toothed wheel while the moving part is in a given angular position.

9. The watch movement according to claim 1, wherein the moving part comprises a second toothed wheel mounted coaxially with the first toothed wheel, the first and second toothed wheels being arranged on the same spindle so that they rotate together, the second toothed wheel meshing with the second toothing.

10. The watch movement according to claim 1, wherein the moving part comprises a third toothing and the movement comprises a drive device for rotating the moving part around said rotational axis via the second toothing; and wherein the drive device is arranged such that the drive device can be actuated from a lateral periphery of the movement to rotate the moving part, so as to create a variation of the active length of the spring from said lateral periphery via the first and second toothed wheels.

11. The watch movement according to claim 10, wherein the drive device comprises an Archimedes screw, one end of which is accessible from the lateral periphery of the movement and which has a non-cylindrical coupling part, to enable the drive device to be coupled to a member for actuating said Archimedes screw.

12. The watch comprising a movement according to claim 11, wherein the watch comprises a case housing the movement and arranged so as to enable the drive device of the moving part to be actuated by the actuating member which can be operated from outside the watch.

13. The watch comprising a movement according to claim 10, wherein the watch comprises a case housing the movement and arranged so as to enable the drive device of the moving part to be actuated by an actuating member which can be operated from outside the watch.

* * * * *